(12) United States Patent
Collins et al.

(10) Patent No.: US 7,679,335 B1
(45) Date of Patent: Mar. 16, 2010

(54) BATTERY CHARGER FOR AIRCRAFT EMERGENCY EGRESS BATTERIES

(76) Inventors: Ralph C. Collins, 12649 N. 30th Dr., Phoenix, AZ (US) 85029; Greg N. Pierce, 1016 N. Palm, Gilbert, AZ (US) 85234

( * ) Notice: Subject to any disclaimer, the term of this patent is extended or adjusted under 35 U.S.C. 154(b) by 78 days.

(21) Appl. No.: 11/456,087

(22) Filed: Jul. 7, 2006

(51) Int. Cl.
*H02J 7/04* (2006.01)
*H02J 7/16* (2006.01)

(52) U.S. Cl. .................. 320/141; 320/125; 320/128; 320/155; 320/157

(58) Field of Classification Search ............... 320/112, 320/116, 119, 124, 125, 126, 150, 157, 155, 320/165; 324/426
See application file for complete search history.

(56) References Cited

U.S. PATENT DOCUMENTS

| | | | | |
|---|---|---|---|---|
| 3,963,976 A | * | 6/1976 | Clark | 320/139 |
| 4,168,212 A | * | 9/1979 | Faktor et al. | 205/790.5 |
| 4,792,743 A | * | 12/1988 | Tsujino et al. | 320/124 |
| 5,554,920 A | * | 9/1996 | Kokuga | 320/148 |
| 5,864,224 A | * | 1/1999 | Takechi et al. | 320/152 |
| 6,094,034 A | * | 7/2000 | Matsuura | 320/134 |
| 6,777,915 B2 | * | 8/2004 | Yoshizawa et al. | 320/137 |
| 7,235,951 B2 | * | 6/2007 | Matsumoto et al. | 320/155 |
| 7,339,354 B2 | * | 3/2008 | Sanpei | 320/141 |
| 7,425,815 B2 | * | 9/2008 | Wong et al. | 320/141 |
| 7,504,803 B2 | * | 3/2009 | Cho | 320/141 |
| 2001/0035735 A1 | * | 11/2001 | Fukuoka et al. | 320/112 |
| 2002/0158609 A1 | * | 10/2002 | Lavington et al. | 320/165 |
| 2003/0217874 A1 | * | 11/2003 | Schoenberg | 180/2.2 |
| 2007/0090797 A1 | * | 4/2007 | Glosser et al. | 320/116 |

* cited by examiner

*Primary Examiner*—Edward Tso
*Assistant Examiner*—Arun Williams
(74) *Attorney, Agent, or Firm*—H. Gordon Shields; Wayne Carroll

(57) ABSTRACT

A battery charger includes one or more channels for independently charging one or more batteries at different current levels. The battery charger also includes multiple modes for each channel for charging a battery with a continuous current or a pulse current. The battery charger supplies charging current by holding the voltage at a set value.

21 Claims, 4 Drawing Sheets

BATTERY CHARGER FOR AIRCRAFT EMERGENCY EGRESS BATTERIES

BACKGROUND

1. Technical Field

This disclosure relates to battery charging systems, and more particularly to rechargeable battery charging systems.

2. Background Art

Rechargeable batteries have been widely used in many different applications, and many different types of rechargeable batteries have been developed including, but not limited to nickel-cadmium, Nickel-metal-hydride, lithium, and Lead Acid. As batteries are charged some batteries are damaged if they are over charged, for instance, in some types of batteries crystals may form which interfere with the battery's ability to store a charge, and the battery's ability to supply voltage or current. Another common problem when charging batteries is overheating of the batteries. When a battery overheats during charging, or as a result from overcharging, the structures inside the battery may become deformed, and the battery will have a reduced life, a reduced ability to store a charge, and a reduced ability to supply voltage or current.

As batteries may be damaged if not charged properly, battery chargers are typically designed to charge one type of battery even if the charger has the ability to charge multiple batteries, all batteries must be the same type. If multiple types of batteries need to be charged, multiple battery chargers must be purchased. Some battery chargers are pre-set to deliver a constant current to the battery for a specific period of time. Some chargers include a sensor to shut off the battery charging process when the battery has reached a specific voltage. Other chargers measure voltage of the battery and charge the battery at one voltage until a certain voltage is reached and then charge the battery at a different voltage for a period of time.

Each battery manufacturer recommends conditions for charging their battery, as the characteristics of batteries from one battery manufacturer to another are different, even for the same type (i.e. Nickel-Cadmium) of battery. Some manufacturers recommend a low voltage or low current charge after the complete charging of the system to maintain the battery at full capacity before the battery is put into use. Other methods of maintaining a battery include a pulse method where current is not continuous, but periodic to maintain the battery. Separate systems from the charging system are often used to maintain the battery at full capacity.

In applications where batteries are used in a regulated industry, or where reliability is very important, testing of batteries also must be done to ensure that the battery can perform as needed. Testing equipment is used in regulated industries, such as the airline industry, to verify and certify the ability of a battery. The testing equipment is typically separate from the charging equipment and the maintenance equipment. Testing equipment may also be specific to a certain manufacturer because the characteristics of batteries from one manufacturer may be different than those from a different manufacturer. If batteries from multiple manufacturers need to be tested, multiple sets of test equipment may be needed. As batteries in some industries need to be charged, tested, and maintained, and batteries are from multiple manufacturers, a large amount of equipment is typically needed to fill these needs.

Typically battery chargers are set to deliver a specific amperage value (current) to the battery over a specific period of time. The battery has some resistance, and according to Ohm's law the Current (I) is equal to the Voltage (E) divided by the resistance (R), or I=E/R. If the current is fixed and the resistance of the battery does not change during the charging cycle then the voltage will not change during the charging cycle. The resistance of the battery does change during the charging cycle, and may increase depending on the temperature of the battery and the amount of charge in the battery. As the temperature of the battery increases the resistance increases. According to Ohm's law, for the current to stay the same when the resistance increases the voltage must also increase. The increased voltage across the battery when charging may increase the temperature of the battery, and the resistance of the battery. As the temperature of the battery increases, the battery may be damaged from over heating. The battery may also become overcharged.

When batteries are overcharged they are damaged. For example Nickel-Cadmium batteries react to heat by forming crystals inside the battery. When a battery is charged the electricity effects a chemical reaction inside the battery, thereby "storing" electricity. When a battery is overcharged much of the electricity flowing into the battery is dissipated as heat instead of effecting a chemical change in the battery. Whether from overcharging or from charging too quickly, when a battery heats up crystals form which interferes with the chemical process, as these crystals become larger and more numerous from repeated overcharging and overheating, the battery is not able to efficiently deliver current as needed and is not longer useful.

The general intent with a battery charger is to recharge a battery to full capacity so that the battery can be used as many times as possible. Systems to maintain batteries are used as it is desirable to have a battery at full capacity when needed. Batteries will perform better if the charging and maintenance is based on the specific characteristics of the battery. As there are many different types, individual batteries will have their own specific charge time based on the battery condition, and the batteries of the same type may vary depending on the manufacturer. Further, batteries of the same type manufactured by the same manufacturer at the same time may vary in characteristics. Therefore it is desirable to have a battery charger that may be adjusted to meet the needs for charging a specific battery as well as the specific needs to maintain the battery. It is also desirable to have a battery charger with multiple channels which can each be adjusted to meet the needs of a specific battery. There is also a need for a battery charger which reduces the chance of overcharging or overheating a battery.

BRIEF SUMMARY

The embodiments of the battery charger disclosed relate to a battery charging system for use in charging batteries having varying characteristics. The battery charging system may include a mode for continuous current supplied to the battery, and a mode for pulse current supplied to the battery. The Term "continuous current" as used in this disclosure is different from "constant current." Continuous current describes a state where current is continuous, but may change value; this is distinguished from a pulsed or periodic current. Constant current describes a state where current is at a constant value and does not change.

The embodiments of the battery charger disclosed may also include the ability for the continuous current to be adjusted based on the needs of a specific battery. The pulse voltage control may also have adjustments including but not limited to, amplitude, duty cycle, frequency, adjustment of the leading edge of the pulse, and adjustment of the trailing edge of the pulse. The embodiments of the battery charger may include a current meter to display the continuous or pulsed current; a volt meter to display the voltage status of the battery or the reference voltage flowing from the battery charger source to the battery circuitry from the battery charger, and indicators to show the status of the battery, and the status of current flowing to the battery. The embodiments of the battery charger may include a timer with multiple functions for beginning and ending the charging of a battery.

The embodiments of the battery charger may include multiple channels for charging batteries, where each channel may be adjusted independently from the other channels to meet the needs of a specific battery. The independent channels may use common meters such as a volt meter, and still be independently controlled and adjusted.

The embodiments of the battery charger may also include detection circuits to detect the battery voltage or the change in battery voltage, the temperature of the battery or the change in battery temperature, and time that a battery has charged or the time since a certain condition was reached. The embodiments of the battery charger may also include a circuit to provide a load for testing the battery under a load. The detection circuits and the load circuit may provide feedback to make changes in the adjustments and modes of the battery charger. The detection circuits and the load circuit may communicate with an external device. The external device may collect data, and may also provide feedback control.

As will be made clear, the disclosed embodiments of the battery charger provide important advantages in the charging, maintaining and testing of batteries, and are particularly adapted to batteries for aircraft egress lighting systems.

DETAILED DESCRIPTION

Figure 1:
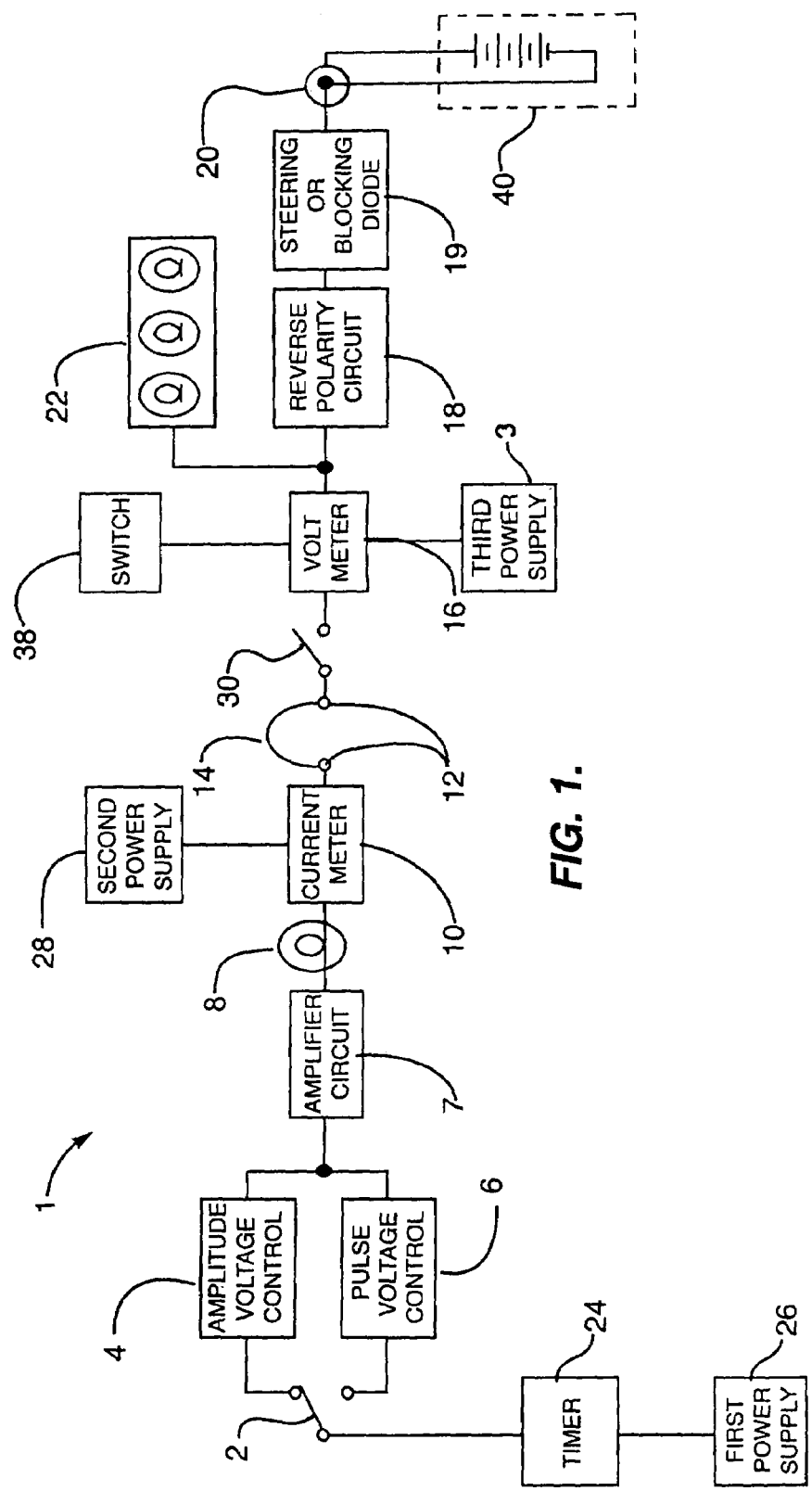
FIG. 1 is a block diagram of an embodiment of a battery charger.

As illustrated in FIG. 1, a block diagram shows an embodiment of a battery charger 1. The battery charger has a first power supply 26, a timer 24, a mode selector switch 2, a voltage control circuit 4, a pulse voltage control circuit 6, a current meter 10, a second power supply 28, and a battery connection 20. Additionally a battery charger may have a status lamp 8, a charger output switch 30, a test port 12, a jumper 14, a voltmeter 16, a reverse polarity circuit 18, and an indicator circuit 22.

Figure 2:
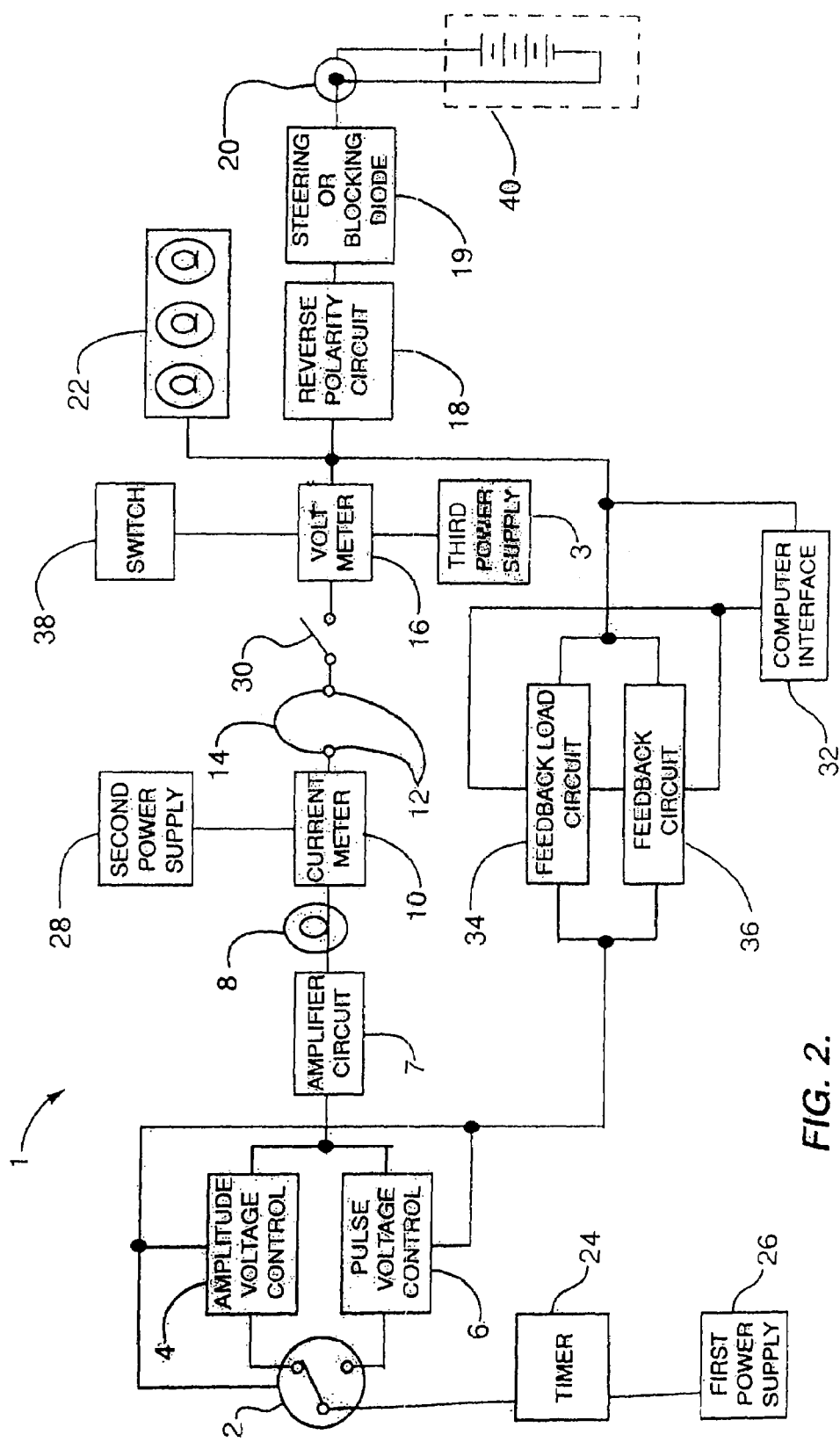
FIG. 2 is a block diagram of another embodiment of a battery charger.

FIG. 2 illustrates another embodiment of a battery charger, where a computer interface 32, a feedback load 34, and a detection and feedback circuit 36 may be added to the battery charger 1.

The first power supply 26 may be a standard regulated power supply as a means for providing a source of current for the battery charger 1. The power supply needs to be capable of supplying the current necessary to charge one or more types of batteries. As some types of batteries require high current or voltage, such as lead-acid batteries, the battery charger may not be able to charge all types of batteries depending capabilities of the power supply. The power supply in the embodiment shown in FIG. 1 may be a power supply which can detect the incoming voltage and frequency, and supply a regulated DC voltage which is consistent regardless of the characteristics of the incoming AC power. This is an advantage as different countries have different power grids supplying different voltages and at different frequencies. As many international travelers have discovered, electronic devices with power supplies designed for one country's power grid may not work when connected in another country with a different power grid. By having a power supply which accepts a wide range of voltages and frequencies, the battery charger may be used in many different countries, without a need to change the power supply.

The timer 24 may have power supplied from the first power supply 26. The timer 24 may also have power supplied from the AC voltage of a country's power grid. Some timers are designed to use the cycles of input AC voltage to operate the clock. For instance in the United States of America the voltage supplied is at 60 hertz, or 60 cycles per second. A clock using the cycles as a measure will measure 60 cycles and then advance one second. The same clock will not keep accurate time in a country where the voltage supplied is 50 cycles per second. The clock will still wait for 60 cycles to advance one second. For this reason the timer 24 may be supplied voltage from the first power supply 26.

The timer 24 shown in FIG. 1 may be used as a switch to switch on or off voltage to the battery charger 1. The timer may have several different functions including but not limited to: a first function where the power is turned off and remains off when the timer completes the count; a second function where power is turned on and remains on when the timer completes the count; a third function where power is turned off after the timer completes a first count and then turns on again after the timer completes a second count; a fourth function where power is turned on after the timer completes a first count and turns off after the timer completes a second count; and a fifth function which is the same as the fourth function except that the cycle repeats. There are many possibilities for the use of a timer with multiple functions, and many functions which are not described but which are known to those skilled in the art of electronic timers.

The timer 24 may be used to shut off the charger after a battery has charged for the time set. In a regulated industry where batteries must be tested and certified, it is necessary to test batteries within a short time after receiving a full charge. It is desirable to have a charger which can complete the charging cycle at a specified time, when personnel and equipment are available. The timer may also be used so that batteries will be at the end of charging at a specified time by using the forth function described above by first setting the time when the charger will turn on, and then setting the time when the charger will turn off, according to how long the batteries need to charge.

The mode selector switch 2 shown in FIG. 1 may be a switch operated by a user to switch the modes from the amplitude voltage control to the pulse voltage control modes. The mode selector switch 2 may also be a switch operated by the load control circuit 34, or a detection and feedback circuit 36. The mode selector switch 2 may also be controlled by a computer interface 32. See FIG. 2.

With the mode selector switch 2 connected to the amplitude voltage control 4 the battery charger 1 can supply a battery with continuous current. With the mode selector switch 2 connected to the pulse voltage control 6 the battery charger can supply a battery with pulses of current. Both the amplitude voltage control and the pulse voltage control may be connected to an amplifier circuit 7 which may be set by a user, and which controls the voltage amplitude of the output voltage or the charging current. The amplifier circuit 7 may include an adjustable resistor which sets a bias voltage, or gain for an amplifier. An amplifier in the amplifier circuit 7 may be used to supply continuous voltage when connected to the amplitude voltage control circuit 4, or may be used to provide a pulse when connected to the pulse voltage control circuit 6.

Figure 4:
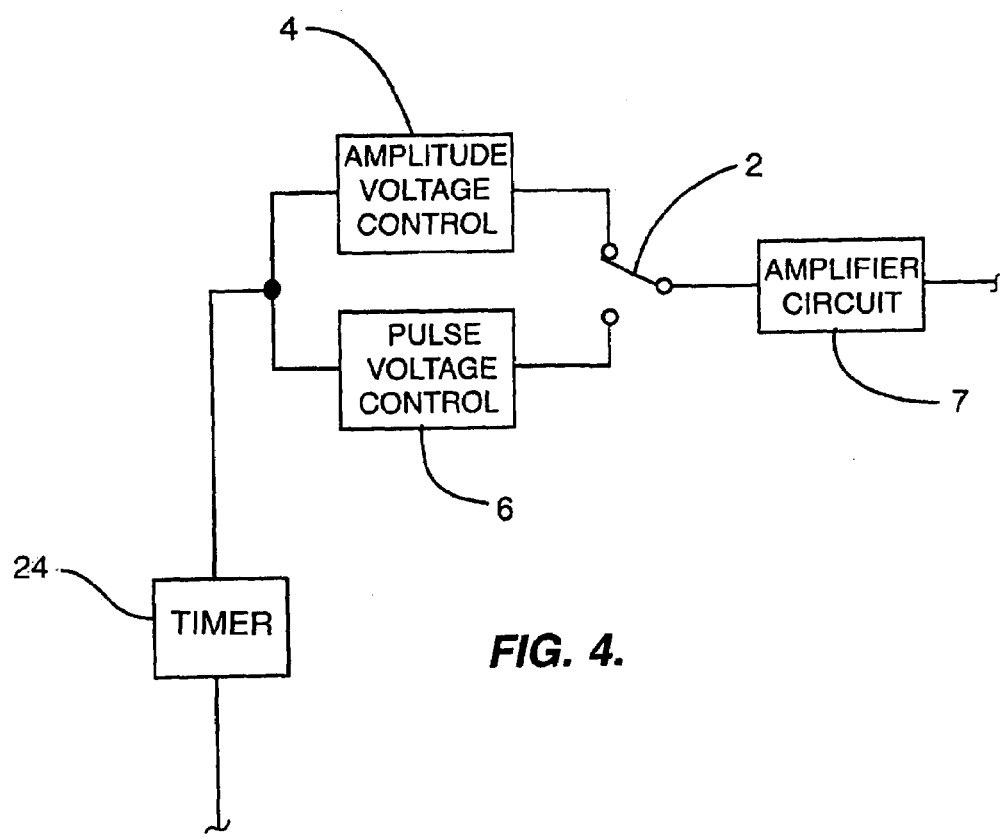
FIG. 4 is a block diagram of and embodiment of part of a battery charger showing a switch.

The mode selector switch 2 may be connected between the timer 24, and the amplitude voltage control 4 and pulse voltage control 6 as shown in FIGS. 1 and 2. The mode selector switch 2 may also be connected between the amplifier circuit 7 and the amplitude voltage control 4 and pulse voltage control 6 as shown in FIG. 4.

The pulse voltage control circuit may include a wave form generator circuit which will control the switching of the amplifier on and off. The wave form generator circuit may include adjustments for the shape of the waveform including the slope of the leading edge, the slope of the trailing edge, the duty cycle and the frequency. The adjustments for the wave form generator may be potentiometers, resistor, capacitors and other components. The adjustments for the waveform generator may also be controlled by the computer interface 32, the feedback load circuit 34, or the detection and feedback circuit 36.

A status lamp 8 may be electrically coupled to the output of the amplifier to show when the current from the amplifier is flowing. In this manner the status lamp would show a steady light when the mode selector switch 2 is set to amplitude voltage control 4 and the amplifier delivers a continuous charging current. When the mode selector switch is set to pulse voltage control 6, the status lamp 8 will turn on and off with the cycling of the pulses. The status lamp may be a light bulb, a light emitting diode, or other device.

As it may be desirable to have the peak value of the of the amplifier circuit 7 be the same in pulse voltage control mode as it is in amplitude voltage control mode, a calibration may be performed. An example calibration may be performed in the following manner. The battery charger 1 is first placed in pulse voltage control mode and the output of the amplifier is monitored to measure the peak value of the amplifier output. The output of the amplifier may be monitored by reading the peak value from three or more cycles to determine an average peak value. The battery charger 1 is then placed in amplitude voltage control mode. The amplitude voltage control 4 may include an adjustable resistor to bias the signal sent to the amplifier circuit 7. The output of the amplifier circuit is measured with the battery charger in amplitude voltage control and the adjustable resistor is adjusted until the value measured in amplitude voltage control mode is the same as the value measured in pulse voltage control mode. Using this example method of calibration, the peak output of the amplifier circuit may be the same for pulse voltage control mode and amplitude voltage control mode.

A current meter 10 may be included as part of a battery charger 1, and electrically coupled to the output of the amplifier circuit 7 to show the amperage of the output from the amplifier. The current meter 10 may have power supplied by an independent regulated power supply, such as power supply 28, which provides isolation from ground and provides an isolated input. The current meter 10 may measure and display the current flowing to a battery 40. With the mode selector switch 2 set to pulse voltage control 6 the value on the current meter 10 may change from zero to the peak current. In an example method for a user to set the initial value of the current for starting a battery charge, the battery charger 1 may be first in amplitude voltage control mode. The amplifier circuit 7 may be adjusted to set the gain for the amplifier to the desired starting output current as read on the current meter 10. The mode selector switch 2 may then be changed to the pulse voltage control mode and the amplifier will deliver a peak voltage that is substantially the same as the amplitude of voltage as was set in the amplitude voltage control mode.

The amplifier may be biased by a voltage set by the amplifier circuit 7 with an output voltage based on the amplifier circuit 7. The amperage as measured on the current meter 10 is based on the output voltage from the amplifier, and the resistance in the battery. As the resistance in the battery changes from the battery charging, based on Ohm's law, the current seen on the current meter 10 changes. If the resistance in the battery 40 increases the current meter 10 will show a decrease in the amperage. This is different from conventional battery chargers which set a constant current, and as the resistance in the battery changes the battery charger compensates by increasing the voltage from an amplifier. Some conventional battery chargers "respond" to the battery by changing cycles based on the voltage in the battery, for instance when the battery voltage reaches full value the amplifier is given a different target for amperage. The disclosed battery charger, however, may "respond" to change in the state of the battery simply based on ohm's law. As the battery voltage increases there is more resistance to the voltage supplied, and current measured decreases.

The method of charging a battery which is disclosed decreases the chance that the battery charger will supply the battery with more current than the battery can use in the form of chemical changes, and therefore the chance of overheating a battery. Charging a battery by using pulses further decreases the chance that a battery will be overheated by the electricity applied to charge the battery as the chemical reactions in the battery are able to complete between the pulses.

A test port 12 may be included with two sides. The test port may be used to calibrate the battery charger. It may be included in the circuit so that a calibration meter may be inserted in series to measure current. When the battery charger 1 is in normal operation a jumper 14 may be inserted into the testing port, which may be removed later for calibration.

A voltmeter 16 may be included in an embodiment of the disclosed battery charger. The voltmeter 16 may have an independent power supply, power supply 3. The voltmeter 16 may include a rotary switch 38 to measure different voltages including the voltage from a power supply as a reference voltage. A charger output switch 30 may also be included as an on-off switch for connecting the charging current to the battery to be charged. The charger output switch may be positioned to disconnect the battery from the amplifier, so that a battery 40 may be safely removed without turning off the main power to the charger. The charger output switch 30 may be positioned and used so that the battery may be disconnected from the amplifier, but still connected to the voltmeter 16, the computer interface 32, the feedback load circuit 34, and the detection and feedback circuit 36. In this manner the battery charger 1 may be used for testing purposes. It will be noted that output from the amplifier circuit 7 is the charge circuit output.

A polarity circuit 18 may be included which indicates an incorrectly attached battery 40, or a battery which has malfunctioned and has a reverse polarity. The polarity circuit 18 may include an indicator such as an LED or a speaker to indicate that the battery 40 has incorrect polarity. The polarity circuit 18 may be connected to terminals of the battery connection 20. A steering diode or blocking diode 19 may also be included in the battery charger and may be positioned to prevent current flowing from a battery in a direction opposite of the charging current. The steering diode or blocking diode 19 may be connected to the battery connection 20.

With the battery 40 connected correctly the indicator circuit 22 may be used to determine the status of the battery. The indicator circuit 22 may have multiple LEDs to indicate the voltage range of the battery 40, and may be used during charging of the battery to indicate the charging status of the battery. The indicator circuit 22 may also be used with the charging current switched off, or even with the power supply 26 switched off. In an example embodiment, a yellow LED may indicate a voltage range below the desired battery voltage range, a green LED may indicate voltage within the desired voltage range, and a red LED may indicate voltage above the desired voltage range. The indicator circuit 22 may contain more or less LEDs to indicate the voltage range and may be used to make a quick determination of the battery status. The indicators in this circuit may be a lamp, and LED or other visual or audio indicator.

The indicators in this circuit may be a lamp, an LED or other visual or audio indicator.

An embodiment of the battery charger may include feedback controls. The feedback controls may include a computer interface 32, a feedback load circuit 34 and a detection and feedback circuit 36. The detection and feedback circuit may measure the battery voltage, battery temperature from a temperature sensor which is mounted on the battery being charged, and battery charge time for the amount of time a battery has been charged, including measuring each pulse when pulse voltage control mode is used.

In some applications batteries need to be tested by applying a load across the battery and testing the ability of the battery to maintain voltage and current across the load for a period of time. This testing is typically performed using equipment separate from the battery charging equipment. The disclosed battery charger may be used to test batteries and gather necessary information to determine if a battery passes certification tests. The computer interface may be used to record data on a computer. The data may include information from the detection and feedback circuit 36 and from the feedback load circuit 34.

The disclosed battery charger may include a feedback load circuit 34 with or without a detection and feedback circuit 36 and with or without a computer interface 32. The feedback load circuit 34 may provide a load, which may be changed based on the characteristics of the battery 40 and the test required for that battery. The feedback load circuit 34 may also be used to determine when a battery 40 is at full capacity and provide feedback to stop the charging. The feedback load circuit 34 may also be used to automatically test a battery 40 when a charging cycle is complete, and gather the data to determine if the battery passes certification. The feedback load circuit may be used to determine the load capability of a battery being charged. After the test, the battery may be recharged by the battery charger. The feedback load circuit 34 may also be used to determine when a battery is at full capacity, and provide feedback to switch modes through the mode selector switch for a trickle charge to maintain the battery at full capacity.

The disclosed battery charger may include a detection and feedback circuit 36 with or without a feedback load circuit 34 and with or without a computer interface 32 as shown in FIG. 2. The detection and feedback circuit 36 may detect conditions relevant to when a battery is at full capacity and provide feedback to the battery charger to stop charging. Conditions relevant to when the battery is at full capacity may include but are not limited to: a rise in the temperature of the battery by a certain amount, the period of time a battery is charged, current flowing through the battery, change in current flowing through the battery, voltage of the battery, change in voltage of the battery, and total energy delivered to the battery.

Figure 3:
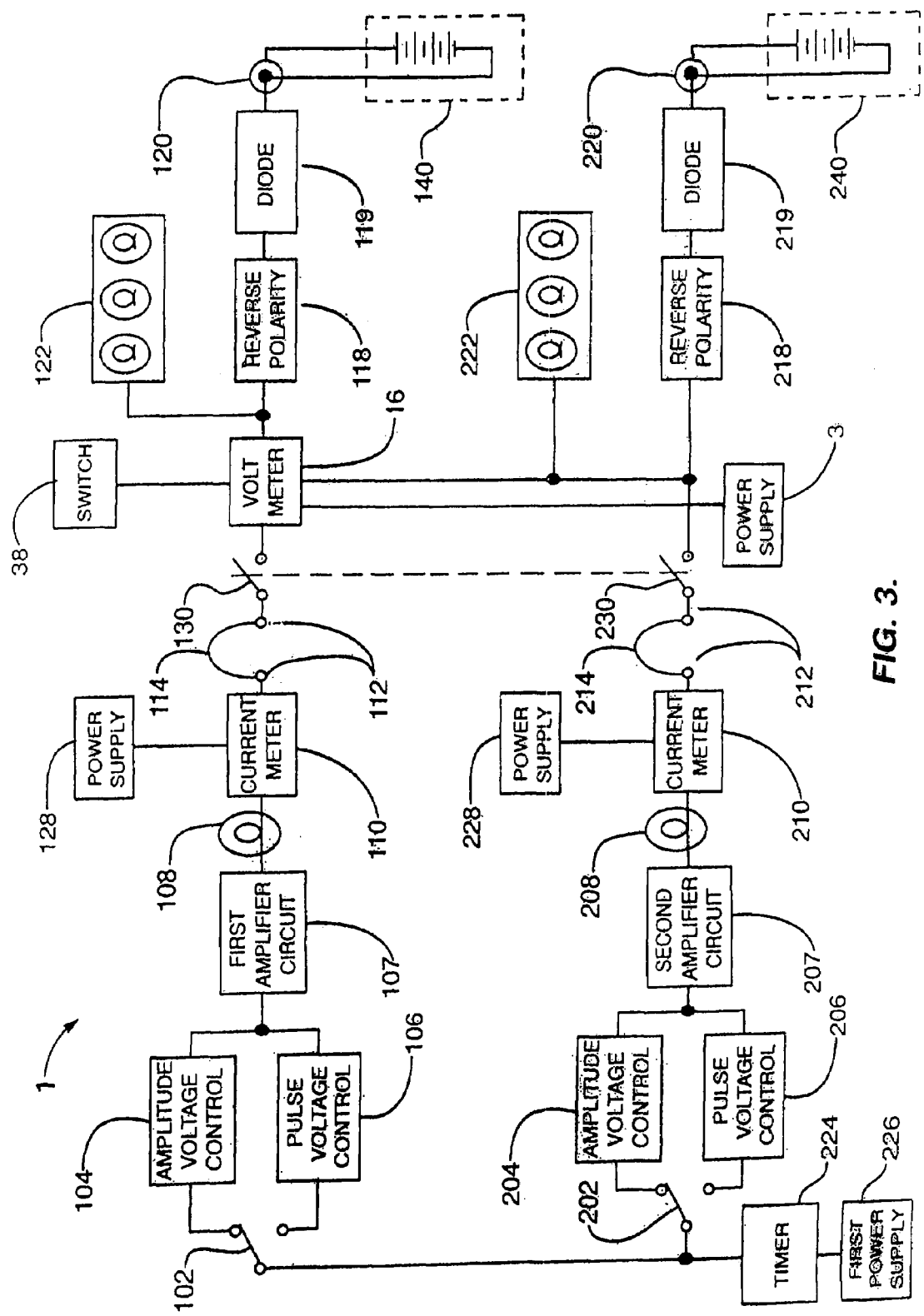
FIG. 3 is a block diagram of an embodiment of a battery charger with multiple channels.

FIG. 3 is a block diagram of an embodiment of a battery charger with multiple channels. FIG. 3 shows two channels with two batteries which may be charged at the same time with independent controls so that the battery 140 connected to channel 1 may be charged with different voltage and charging current settings from the battery 240 connected to channel 2. Although only two channels are shown in FIG. 3 the example embodiment illustrates how multiple channels of two or more may be connected in a battery charger. FIG. 3 does not show the detection and feedback circuit 36, feedback load circuit 34 and computer interface 32 as shown in FIG. 2, but the battery charger 1 may be provided with multiple channels where each channel is connected to a separate detection and feedback circuit 36 with or without a feedback load circuit 34 and with or without a computer interface 32.

FIG. 3 shows a first channel of a battery charger 1 which may include a First Channel Mode selector switch 102; a First Channel Amplitude voltage control 104; a First Channel Pulse voltage control 106; a First Channel Amplifier Circuit 107; a First Channel Status Lamp 108; a First Channel Current Meter 110; a First Channel Test Port 112; a First Channel Jumper 114; a First Channel Polarity Circuit 118; a First Channel Steering diode or Blocking diode 119; a First Channel Battery Connection 120; a First Channel Indicator circuit 122; and a First Channel Current Meter Power Supply 128. The first channel may be connected to a First Channel Battery 140.

The operation of the first channel may be the same as the operation of the battery charger described and shown in FIGS. 1 and 2. The volt meter 16 may be connected to more than one channel using a switch to read one channel at a time. The voltmeter 16 may also be connected to the power supply 26, to read a reference voltage. The voltmeter 16 may be included in each channel with separate voltmeters for each channel. The charger output switch 30 may be a single throw switch with multiple poles so that one switch may be used to turn off the charger output for multiple channels. The charger output switch 30 may be included as a separate switch in each channel.

A second channel may be included similar to the first channel and may include a Second Channel Mode selector switch 202; a Second Channel Amplitude voltage control 204; a Second Channel Pulse voltage control 206; a Second Channel Amplifier Circuit 207; a Second Channel Status Lamp 208; a Second Channel Current Meter 210; a Second Channel Test Port 212; a Second Channel Jumper 214; a Second Channel Polarity Circuit 218; a Second Channel Steering diode or Blocking diode 219; a Second Channel Battery Connection 220; a Second Channel Indicator circuit 222; and a Second Channel Current Meter Power Supply 228. The second channel may be connected to a Second Channel Battery 240. The first channel current meter power supply 128 and the second channel current meter power supply 228 may be independent power supplies isolated from ground and other power supplies to provide an isolated input.

In the example embodiment with multiple channels the charging current provided to each battery may be adjusted independently from the other channels using the first channel amplifier circuit 107 and the second amplifier circuit 207. Additional channels may be added with an amplifier circuit for each channel.

While the principles of the invention have been made clear in illustrative embodiments, there will be immediately obvious to those skilled in the art many modifications of structure, arrangement, proportions, and methods, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What is claimed is:

1. Battery charging apparatus comprising in combination:
   means for providing a source of current;
   a timer for setting a predetermining a length of time for charging the battery;
   an amplitude voltage control circuit for providing a first mode of charging;
   a pulse voltage control circuit for providing a second mode of charging;
   a mode selector switch for selecting a mode of charging to the first mode of charging or to the second mode of charging;
   means for setting a desired charging current;
   a current meter for displaying the charging current;
   means for connecting the charging current to the battery to be charged; and
   an on-off switch for connecting the charging current to the battery to be charged for the predetermined length of time.

2. The battery charging apparatus of claim 1 in which the amplitude voltage control circuit holds the voltage substantially constant for the predetermined charge time.

3. The battery charging apparatus of claim 1 in which the pulse voltage control circuit provides pulses of substantially constant voltage for predetermined time periods.

4. The battery charging apparatus of claim 1 in which the means for providing a source of current includes a regulated power supply connected to the mode selector switch.

5. The battery charging apparatus of claim 4 which further includes means for indicating the charging status of the battery being charged.

6. The apparatus of claim 5 in which the means for indicating the charging status includes a plurality of light emitting diodes.

7. The apparatus of claim 6 in which the means for indicating the charging status is in parallel with the charging current to the battery being charged.

8. The apparatus of claim 1 which further includes means for calibrating the current meter.

9. The apparatus of claim 1 which further includes means for indicating reverse polarity between the charging current and the battery to be charged.

10. The apparatus of claim 1 which further includes means for detecting a load capability of the battery being charged.

11. The apparatus of claim 1 which further includes a computer interface for connecting the battery charging apparatus to a computer, wherein the computer interface performs at least one of the functions of switching the mode selector switch; controlling the pulse voltage control circuit; measuring battery conditions; and recording data on the computer.

12. The battery charging apparatus of claim 1 in which the battery to be charged is an aircraft egress lighting battery.

13. The apparatus of claim 1 which further includes means for preventing current flowing from current flowing from the battery in a direction opposite of the charging current, electrically coupled to the means for connecting the charging current to the battery to be charged.

14. The apparatus of claim 13 in which the means for preventing current flowing from the battery in an opposite direction of the charging current is a diode.

15. Apparatus for charging a plurality of batteries comprising in combination:
   means for providing a source of current;
   a plurality of amplitude voltage control circuits;
   means for independently controlling the amplitude of each circuit of the plurality of amplitude voltage control circuits and defining a first mode for charging the plurality of batteries;
   a plurality of pulse voltage control circuits;
   means for independently controlling the amplitude of the voltage of each circuit of the plurality of pulse voltage control circuits and defining a second mode for charging the plurality of batteries;
   a mode selector switch for selecting a mode for charging the plurality of batteries to the first mode of charging or to the second mode of charging;
   a timer for setting a predetermined length of time for charging the batteries;
   means for setting a desired charging current for each battery of the plurality of batteries to be charged;
   a plurality of meters for displaying the charging current to the plurality of batteries to be charged;
   means for connecting the charging current to the plurality of batteries to be charged; and
   an on-off switch for connecting the charging current to the plurality of batteries.

16. The apparatus of claim 15 in which the plurality of amplitude voltage control circuits holds the voltages substantially constant for the predetermined charge time.

17. The apparatus of claim 15 in which the plurality of pulse voltage control circuits provide pulses of substantially constant voltage for the predetermined charge time.

18. The apparatus of claim 15 in which the means for providing a source of current includes a regulated power supply connected to the mode selector switch.

19. The apparatus of claim 18 which further includes means for indicating the charging status of each battery of the plurality of batteries being charged.

20. The apparatus of claim 15 which further includes means for calibrating the plurality of meters for displaying the charging current for the batteries being charged.

21. The apparatus of claim 15 which further includes means for preventing current flowing from the plurality of batteries in a direction opposite of the charging current, electrically coupled to the means for connecting the charging current to the plurality of batteries to be charged.

* * * * *